(12) United States Patent
Huddleston et al.

(10) Patent No.: US 8,891,179 B2
(45) Date of Patent: Nov. 18, 2014

(54) LENS AND APPLICATIONS THEREOF

(75) Inventors: Jeremy Huddleston, Concord, NC (US); Donald Rosenberry, Rancho Santa Margarita, CA (US)

(73) Assignee: FLIR Systems Trading Belgium BVBA, Meer (BE)

(*) Notice: Subject to any disclaimer, the term of this patent is extended or adjusted under 35 U.S.C. 154(b) by 0 days.

(21) Appl. No.: 13/375,526

(22) PCT Filed: Jun. 11, 2010

(86) PCT No.: PCT/US2010/038391
§ 371 (c)(1),
(2), (4) Date: Dec. 1, 2011

(87) PCT Pub. No.: WO2010/144853
PCT Pub. Date: Dec. 16, 2010

(65) Prior Publication Data
US 2012/0075725 A1    Mar. 29, 2012

Related U.S. Application Data

(60) Provisional application No. 61/186,273, filed on Jun. 11, 2009.

(51) Int. Cl.
*G02B 3/02* (2006.01)
*G02B 13/00* (2006.01)

(52) U.S. Cl.
CPC .............. *G02B 13/0085* (2013.01); *G02B 3/02* (2013.01); *G02B 13/0025* (2013.01); *G02B 13/006* (2013.01)

USPC .......................................... 359/718; 359/796

(58) Field of Classification Search
CPC ........ G02B 3/00; G02B 3/02; G02B 13/0025; G02B 9/02
USPC ................... 359/642, 647, 718, 796
See application file for complete search history.

(56) References Cited

U.S. PATENT DOCUMENTS

2009/0040626 A1* 2/2009 Oh et al. ................ 359/716
2011/0002053 A1* 1/2011 Ovrutsky et al. ............. 359/738

FOREIGN PATENT DOCUMENTS

EP        1 862 832 A1    12/2007

OTHER PUBLICATIONS

Patent Cooperation Treaty, International Search Report, International Application No. PCT/US2010/038391, mailed Dec. 22, 2010.
Patent Cooperation Treaty, Written Opinion, International Application No. PCT/US2010/038391, mailed Dec. 22, 2010.
"Gesamtkatalog," Spindler & Hoyer, Gottingen, pp. 6-9, Jan. 1, 1993, XP-002593619.
"Code V Prompting Guide," Optical Research Associates, Pasadena, pp. 28-34, Oct. 31, 1999, XP-002593620.

* cited by examiner

*Primary Examiner* — Darryl J Collins
(74) *Attorney, Agent, or Firm* — Kilpatrick Townsend & Stockton LLP

(57) ABSTRACT

The present invention, in some embodiments, provides a low distortion singlet lens and optical imaging apparatus including the same.

37 Claims, 10 Drawing Sheets

LENS AND APPLICATIONS THEREOF

RELATED APPLICATION DATA

The present application claims priority pursuant to 35 U.S.C. §119(e) to U.S. Provisional Patent Application Ser. No. 61/186,273, filed Jun. 11, 2009 which is hereby incorporated by reference in its entirety.

FIELD OF THE INVENTION

The present invention relates to lenses for use in optical apparatus and systems.

BACKGROUND OF THE INVENTION

Imaging properties of lenses used in optical apparatus and systems can suffer from one or more optical aberrations, such as astigmatism, chromatic aberration, distortion, field curvature and spherical aberration. Optical aberrations can be mitigated through several techniques, including utilization of various structures in conjunction with the lens. In one technique, an external stop is positioned in front of the object side of a lens to assist in correcting off-axis aberrations. Moreover, additional lens structures can be used to correct optical aberrations of a first lens. Achromat doublets, for example, can be used to minimize chromatic aberration of a first lens.

While offering greater degrees of freedom for correcting optical aberrations, optical apparatus comprising compound lens arrangements and/or external stops demonstrate cost and fabrication disadvantages in comparison to optical apparatus based on single element (singlet) lens designs. The use of multiple lenses and/or external stops can increase manufacturing costs as multiple components are required for apparatus completion. Additionally, multiple lenses and/or external stops can increase manufacturing time as these components require accurate alignment and are subject to tight tolerances. Furthermore, a faulty lens or external stop or misalignment thereof can render the optical apparatus defective thereby increasing manufacturing inefficiencies.

SUMMARY

In view of the foregoing disadvantages, the present invention provides a singlet lens that, in some embodiments, can assist in mitigating one or more optical aberrations. In some embodiments, a singlet lens described herein does not work in conjunction with an external stop to reduce one or more optical aberrations.

In one embodiment, a singlet lens comprises an object side optical surface and an image side optical surface, the object side optical surface having a convex shape at the vertex of the surface and the image side optical surface having a convex shape at the vertex of the surface, the singlet lens satisfying Equation (I):

$$t_c \geq xD \quad (I)$$

wherein $t_c$ is the center thickness of the singlet lens, D is the distance from the image plane of the singlet lens to the lens vertex of the object side optical surface and x is at least 0.30. In some embodiments, x ranges from 0.30 to 0.75. In another embodiment, x ranges from 0.40 to 0.60. In some embodiments, x ranges from 0.45 to 0.55. Distance D is sometimes referred to as track length.

In some embodiments, the object side optical surface of the singlet lens is aspherical. In some embodiments, the image side optical surface of the singlet lens is aspherical. In some embodiments, the object side and the image side optical surfaces of the singlet lens are aspherical. Moreover, in one embodiment, the asphericity of the image side optical surface is greater than the asphericity of the object side optical surface of the lens. Aspherical surfaces of singlet lenses of the present invention, in some embodiments, can be represented by Equation (II):

$$S(r) = a_1 r^2 + a_2 r^4 + a_3 r^6 + a_4 r^8 + a_5 r^{10} + a_6 r^{12} + a_7 r^{14} + a_8 r^{16} \quad (II)$$

wherein $a_1$ through $a_8$ are asphericity coefficients and r is height of the surface from the optical axis.

In some embodiments, the optical power of the singlet lens is substantially equally partitioned between object side optical surface and the image side optical surface. In some embodiments, for example, the object side optical surface and the image side optical surface of the singlet lens satisfy the Equation (III):

$$|(|{}^o a_1| - |{}^i a_1|)| < |{}^{o,i} a_1| \quad (III)$$

wherein ${}^o a_1$ is the coefficient of the $r^2$ term for the object side optical surface according to Equation (II), ${}^i a_1$ is the coefficient of the $r^2$ term for the image side optical surface according to Equation (II) and ${}^{o,i} a_1$ is the coefficient of the $r^2$ term for the object side optical surface or the image side optical surface according to Equation (II), whichever has the smaller magnitude.

In some embodiments, ${}^o a_1$ is the coefficient of the $r^2$ term over an inner portion of the object side optical surface according to the equation (IV):

$$S(r) = {}^o a_1 r^2 \quad (IV)$$

and ${}^i a_1$ is the coefficient of the $r^2$ term over an inner portion of the image side optical surface according to the equation (V):

$$S(r) = {}^i a_1 r^2 \quad (V)$$

wherein the inner portion of the object side optical surface is the portion of the object side optical surface fit by the equation $S(r) = {}^o a_1 r^2$ to a $R^2$ goodness of fit of at least 0.98 and wherein the inner portion of the image side optical surface is the portion of the image side optical surface fit by the equation $S(r) = {}^i a_1 r^2$ to a $R^2$ goodness of fit of at least about 0.98.

In some embodiments, the optical power of the object side optical surface can be quantified by fitting the surface to Equation (IV), and the optical power of the image side optical surface can be quantified by fitting the surface to Equation (V).

In one embodiment, for example, the object side optical surface and the image side optical surface of the singlet lens satisfy the Equation (VI):

$$0.5 < \frac{|{}^o a_1|}{|{}^i a_1|} < 2 \quad (VI)$$

wherein ${}^o a_1$ is the coefficient of the $r^2$ term for the object side optical surface according to Equation (IV), and ${}^i a_1$ is the coefficient of the $r^2$ term for the image side optical surface according to Equation (V). Moreover, the power term of Equations (IV) and (V) can be used to describe a portion of each lens surface under the condition that the $R^2$ goodness of fit parameter is greater than about 0.98.

In some embodiments, the portion of each lens surface under the condition that the $R^2$ goodness of fit parameter is greater than about 0.98 is an inner or interior portion of the lens surface. In some embodiments, an inner or interior portion comprises less than 90% of the surface in the clear aperture of the lens. FIG. 6 illustrates the relationship between the goodness of fit for the image side optical surface of Example 1 in Table 3 and the aperture of the lens surface over which the power term is fit.

In some embodiments, a singlet lens further comprises an aperture positioned closer to the image plane than the vertex of the object side optical surface. An aperture, in some embodiments, is positioned between the object side optical surface and the image side optical surface.

A singlet lens, in some embodiments of the present invention, comprises a wafer level construction. In one embodiment, for example, an object side optical structure comprising the object side optical surface and an image side optical structure comprising the image side optical surface are foamed or disposed on a optically transmissive substrate wafer. In being of wafer level construction, singlet lenses, in some embodiments, are fabricated by wafer level techniques.

In some embodiments, a singlet lens of the present invention demonstrates a monolithic structure comprising an object side optical surface and an image side optical surface.

In another aspect, the present invention provides an optical apparatus comprising a singlet lens described herein. In some embodiments, the optical apparatus further comprises an optoelectronic element. In some embodiments, the optoelectronic element is coupled to the singlet lens by a spacer. In another embodiment, the singlet lens is coupled to the coverglass of a packaged optoelectronic element by a spacer.

In some embodiments, an optical apparatus comprising a singlet lens described herein comprises a mobile communication device, such as a cellular phone, mobile handset or computer.

In another aspect, the present invention provides a optical wafer comprising a plurality of joined singlet lenses described herein. In some embodiments, the optical wafer comprising the plurality of joined singlet lenses is coupled to a sensor wafer comprising a plurality of joined sensing elements, wherein the plurality of singlet lenses align with the plurality of sensing elements to provide a plurality of joined optical apparatus. In some embodiments, the optical wafer is coupled to the sensor wafer by a perforated wafer, such as a spacer wafer. Moreover, in some embodiments, the plurality of joined optical apparatus can be singulated to provide a plurality of individual optical apparatus.

In another aspect, the present invention provides methods of making a singlet lens described herein. In one embodiment, a method of making a singlet lens comprises providing a optically transmissive substrate, disposing an object side optical surface on the substrate and disposing an image side optical surface on the substrate, the object side optical surface having a convex shape at the vertex of the surface and the image side optical surface having a convex shape at the vertex of the surface, the singlet lens satisfying Equation (I). In some embodiments, the object side optical surface and the image side optical surface are aspherical having any of the properties described herein.

In some embodiments, the substrate comprises a substrate wafer on which a plurality of object side optical surfaces and a plurality of image side optical surfaces are deposited to provide a plurality of joined singlet lenses of the present invention. In some embodiments, the plurality of joined singlet lenses is an array of joined singlet lenses.

In another aspect, the present provides a method of making a plurality of optical imaging apparatus. In one embodiment, a method of making a plurality of optical imaging apparatus comprises providing an optical wafer comprising a plurality of singlet lenses of the present invention, providing a sensor wafer comprising a plurality of sensing elements and coupling the optical wafer to the sensor wafer with a perforated wafer to provide a plurality of joined optical imaging apparatus. Coupling the optical wafer to the sensor wafer, in some embodiments, achieves the desired alignment between the plurality of singlet lenses and the plurality of sensing elements. In some embodiments, the method further comprises singulating the plurality of joined optical imaging apparatus to provide a plurality of individual imaging apparatus.

In another embodiment, a method of making a plurality of optical imaging apparatus comprises providing an optical wafer comprising a plurality of singlet lenses of the present invention and singulating the plurality of singlet lenses. The singulated singlet lenses are subsequently coupled to one another by a perforated wafer and coupled to a sensor wafer through the perforated wafer, the sensor wafer comprising a plurality of sensing elements. Coupling the plurality of singlet lenses to the sensor wafer through the perforated wafer, in some embodiments, achieves the desired alignment between plurality of singlet lenses and the plurality of sensing elements to provide a plurality of joined optical imaging apparatus. In some embodiments, the method further comprises singulating the plurality of joined optical imaging apparatus to provide a plurality of individual imaging apparatus.

In a further aspect, the present invention provides a method of imaging a scene. In one embodiment, a method of imaging a scene comprises providing an optical imaging apparatus comprising a singlet lens described herein and a sensing element and receiving electromagnetic radiation from the scene. The received electromagnetic radiation passes through the singlet lens and is detected by the sensing element. The sensing element translates the received electromagnetic radiation into an electrical response for constructing an electronic image of the scene. In some embodiments, the imaged scene has a TV distortion according to Equation (VII) of less than about 6%.

$$\text{TV Distortion}(\%) = 100 \times [(A_1 + A_2)/2) - B]/B \quad \text{(VII)}$$

wherein $A_1$ and $A_2$ are the edge heights of the image and B is the center height of the image. In some embodiments, the imaged scene has a TV distortion according to Equation (VII) of less than about 5% or less than about 2%. In another embodiment, the imaged scene has a TV distortion according to Equation (VII) of less than about 0.5%.

In some embodiments, the imaged scene has a maximum optical distortion according to Equation (VIII) of less than about 6% over a field of view of at least 50°.

$$\text{Distortion}(\%) = [(h_i/h_p) - 1] \times 100 \quad \text{(VIII)}$$

wherein $h_i$ is the distance from the image center to any chosen field point within the scene and $h_p$ is the distance from the image center to where the chosen field point would be if the image had no distortion. In some embodiments, the imaged scene has an optical distortion according to Equation (VIII) of less than about 3% over a field of view of at least 50°.

In some embodiments of imaging a scene, the optical apparatus comprises a solid state camera.

These and other embodiments are described in greater detail in the detailed description which follows.

DETAILED DESCRIPTION

Figure 1A:
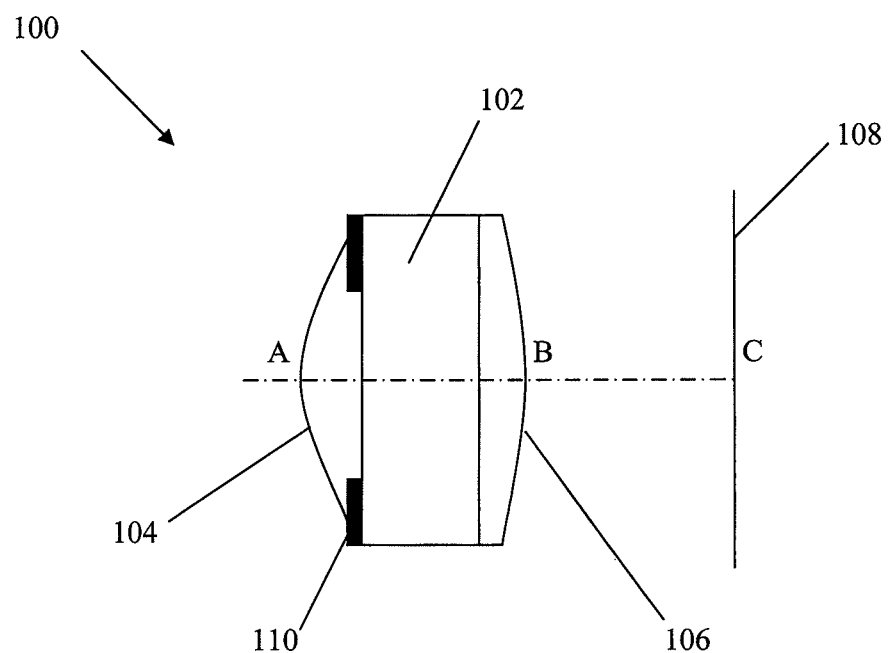
FIG. 1A illustrates a singlet lens according to one embodiment of the present invention.

The present invention can be understood more readily by reference to the following detailed description, examples and drawings and their previous and following descriptions. Elements, apparatus and methods of the present invention, however, are not limited to the specific embodiments presented in the detailed description, examples and drawings. It should be recognized that these embodiments are merely illustrative of the principles of the present invention. Numerous modifications and adaptations will be readily apparent to those of skill in the art without departing from the spirit and scope of the invention.

The present invention provides a singlet lens that, in some embodiments, can assist in mitigating one or more optical aberrations. Moreover, in some embodiments, a singlet lens described herein does not work in conjunction with a stop external to the lens to reduce one or more optical aberrations.

In one embodiment, a singlet lens comprises an object side optical surface and an image side optical surface, the object side optical surface having a convex shape at the vertex of the surface and the image side optical surface having a convex shape at the vertex of the surface, the singlet lens satisfying the Equation (I):

$$t_c \geq xD \qquad (I)$$

wherein $t_c$ is the center thickness of the singlet lens, D is the distance from the image plane to the vertex of the object side optical surface and x is at least 0.30. In some embodiments, x ranges from 0.30 to 0.75. In another embodiment, x ranges from 0.40 to 0.60. In some embodiments, x ranges from 0.50 to 0.55.

In some embodiments, a singlet lens further comprises an aperture positioned closer to the image plane than the vertex of the object side optical surface. An aperture, in some embodiments, is positioned between the object side optical surface and the image side optical surface.

A singlet lens, in some embodiments of the present invention, comprises a wafer level construction. In one embodiment, for example, an object side optical structure comprising the object side optical surface and an image side optical structure comprising the image side optical surface are formed or disposed on an optically transmissive substrate wafer.

In being of wafer level construction, singlet lenses, in some embodiments, are fabricated by wafer level techniques. Exemplary wafer level techniques may include replication, etching, embossing, imprinting, and other molding or lithographic processes. As used herein, the term "wafer" is intended to mean any substrate that includes generally planar surfaces on which a plurality of components are formed. Component dies may be separated through the planar surface prior to final use. Generally, wafers may be circular, rectangular, or other shapes and may be rigid or flexible as appropriate for a particular application.

Optically transmissive, as used herein, refers to the ability to at least partially pass radiation in the visible, infrared, and/or ultraviolet region of the electromagnetic spectrum. In some embodiments, optically transmissive materials can pass visible electromagnetic radiation with minimal absorbance or other optical interference.

Figure 1B:
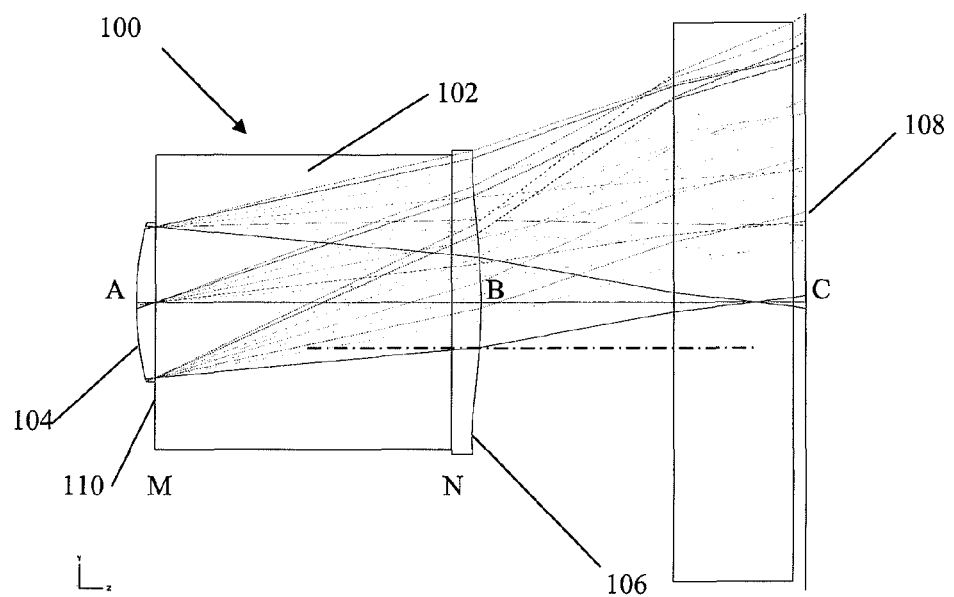
FIG. 1B illustrates a singlet lens according to one embodiment of the present invention.
Figure 1C:
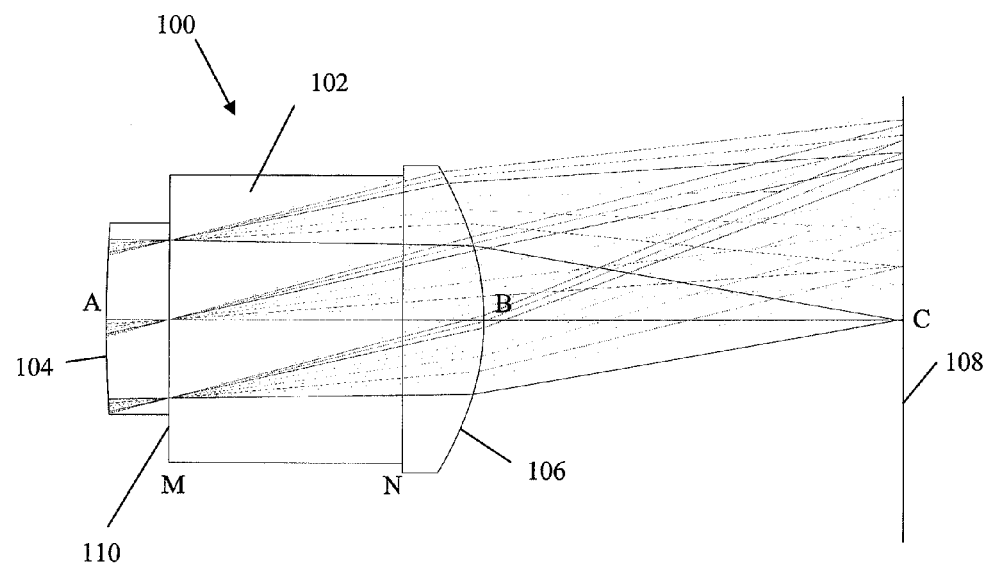
FIG. 1C illustrates a singlet lens according to one embodiment of the present invention.

FIG. 1 illustrates a wafer level singlet lens according to one embodiment of the present invention. In the embodiment illustrated in FIG. 1, the wafer level singlet lens (100) comprises a optically transmissive substrate (102), an object side optical structure (112) comprising the object side optical surface (104) disposed on one side of the substrate and an image side optical structure (114) comprising the image side optical surface (106) disposed on the opposing side of the substrate (102). The object side optical surface (104) has a convex shape at the vertex of the surface, and the image side optical surface (106) has a convex shape at the vertex of the surface.

The wafer level singlet lens (100) has an image plane (108) associated therewith. The wafer level singlet lens (100) further comprises an aperture (110) positioned at the interface of the substrate (102) and the object side optical structure (112).

According to some embodiments described herein, a singlet lens satisfies Equation (I). In the embodiment illustrated in FIG. 1, D is equivalent to line segment AC and $t_c$ is equivalent to line segment AB.

Turning now to components of singlet lenses of the present invention, singlet lenses of the present invention comprise an object side optical surface and an image side optical surface. The object side and image side optical surfaces can comprise any material not inconsistent with the objectives of the present invention. In some embodiments, the object side and image side optical surfaces comprise polymeric materials. Polymeric materials suitable for forming optical surfaces, in some embodiments, comprise epoxides, oxetanes or acrylates such as polyacrylic acid, polymethacrylic acid, polymethylmethacrylate or combinations thereof. In some embodiments, suitable polymeric materials for optical surfaces comprise maleate esters, thiol-ene polymers, or vinylethers. Suitable lens surface polymeric materials, in another embodiment, comprise perfluorocyclobutane (PFBC) containing polymers, such as perfluorocyclobutane poly(arylether)s. In some embodiments, suitable polymeric materials for lens surfaces can comprise copolymers of two or more of the foregoing polymeric species.

In some embodiments, the object side and image side optical surfaces comprise glass materials. In one embodiment, for example, a suitable glass material comprises spin-on glass.

The object side optical surface and the image side optical surface, in some embodiments, comprise the same material. In one embodiment, for example, the object side and image side optical surfaces comprise the same polymeric material. In other embodiments, the object side and image side optical surfaces comprise different materials. In one embodiment, for example, the object side optical surface comprises a polymeric material different from the image side optical surface. In another embodiment, the object side optical surface comprises a polymeric material and the image side optical surface comprises a glass material. In some embodiments, the object side optical surface comprises a glass material and the image side optical surface comprises a polymeric material.

In some embodiments, any of the foregoing materials suitable for forming object side and image side optical surfaces are suitable for forming optical structures comprising object side or image side optical surfaces.

In some embodiments of singlet lenses comprising a substrate, an object side optical structure comprising the object side optical surface and an image side optical structure comprising the image side optical surface can have any desired thicknesses not inconsistent with the objectives of the present invention. In some embodiments, for example, the object side optical structure comprising the object side optical surface and the image side optical structure comprising the image side optical surface have thicknesses sufficient to provide a center thickness ($t_c$) satisfying Equation (I). In other embodiments, the object side optical structure comprising the object side optical surface and the image side optical structure comprising the image side optical surface have a thickness that, when combined with a substrate disposed between the structures, provide a center thickness ($t_c$) satisfying Equation (I).

In some embodiments, a singlet lens further comprises an optically transmissive substrate disposed between the object side optical surface and the image side optical surface. In some embodiments, an optically transmissive substrate comprises any suitable type of glass not inconsistent with the objectives of the present invention. In other embodiments, a optically transmissive substrate comprises any polymeric material not inconsistent with the objectives of the present invention. In some embodiments, for example, optically transmissive polymeric materials include polycarbonates or polyacrylates such as polyacrylic acid, polymethacrylate, polymethylmethacrylate or mixtures thereof.

An optically transmissive substrate can have any desired thickness not inconsistent with the objectives of the present invention. In some embodiments, an optically transmissive substrate has a thickness that, when combined with the thicknesses of an object side optical structure comprising the object side optical surface and the image side optical structure comprising the image side optical surface provides a center thickness ($t_c$) satisfying Equation (I). In one embodiment, for example, an optically transmissive substrate has a thickness of at least about 0.7 μm. In another embodiment, an optically transmissive substrate has a thickness of about 1 mm. In some embodiments, the substrate of a singlet lens described herein accounts for substantially all of the thickness of the singlet lens.

As provided herein, in some embodiments, a singlet lens further comprises an aperture positioned closer to the image plane than the vertex of the object side optical surface. An aperture, in some embodiments, is positioned between the object side surface and the image side surface.

In some embodiments, a material delineating the aperture comprises a metal. Metals can comprise elementally pure metals or alloys thereof. In some embodiments, metals comprise transition metals, aluminum or combinations thereof. A metal, in some embodiments, comprises a metal film. In some embodiments, the metal may be deposited on the substrate using lithographic or sputtering techniques, for example.

In other embodiments, a material delineating the aperture comprises one or more polymeric materials, such as a photolithographic resist resin. In some embodiments, a photolithographic resist comprises a positive resist or a negative resist. A photolithographic resist, in some embodiments, comprises a chemically amplified resist. In another embodiment, a material delineating the aperture comprises a combination of one or more polymeric materials and one or more metals.

An material delineating the aperture has a thickness sufficient to block the transmission of radiation of the desired wavelength or range of wavelengths. In some embodiments, the material has a thickness ranging from about 50 nm to about 1 μm.

In some embodiments, the object side optical surface of the singlet lens is aspherical. In some embodiments, the image side optical surface of the singlet lens is aspherical. In some embodiments, the object side and the image side optical surfaces of the singlet lens are aspherical. As provided herein, aspherical surfaces of singlet lenses of the present invention, in some embodiments, can be represented by Equation (II).

Tables I and II provide asphericity coefficients for object side optical surfaces and image side optical surfaces of singlet lenses of two Examples of the present invention according to Equation (II). The singlet lens of Example I is illustrated in Figure IB, and the singlet lens of Example II is illustrated in Figure IC. The numbered elements of the singlet lenses of Examples I and II in Figures IB and IC correspond to the same in Figure IA.

TABLE I

Asphericity Coefficients for Optical Surfaces of Singlet Lens of Example I

| Optical Surface | Coeff. | | | |
|---|---|---|---|---|
| | $a_1$ | $a_2$ | $a_3$ | $a_4$ |
| Object Side | 0.471838654 | −1.18102411 | 55.66360026 | −737.8261198 |
| Image Side | −0.247940357 | 0.218083219 | 4.2963719 | −37.46207396 |

| Optical Surface | Coeff. | | | |
|---|---|---|---|---|
| | $a_5$ | $a_6$ | $a_7$ | $a_8$ |
| Object Side | −5615.486525 | 90529.08678 | 1915124.827 | −20803068.62 |
| Image Side | 178.9403295 | −758.8150216 | 3611.423515 | −7321.417303 |

TABLE II

Asphericity Coefficients for Optical Surfaces of Singlet Lens of Example II

| Optical Surface | Coeff. | | | |
|---|---|---|---|---|
| | $a_1$ | $a_2$ | $a_3$ | $a_4$ |
| Object Side | 0.075605078 | −0.013594046 | −0.328907854 | −0.267881728 |
| Image Side | −0.374824469 | −0.023569247 | 0.054642756 | −0.663614967 |

TABLE II-continued

Asphericity Coefficients for Optical Surfaces of Singlet Lens of Example II

| Optical Surface | Coeff. | | | |
|---|---|---|---|---|
| | $a_5$ | $a_6$ | $a_7$ | $a_8$ |
| Object Side | 8.751205815 | 70.49555697 | −589.8997396 | 631.2510604 |
| Image Side | 1.51583606 | 5.024327396 | −18.16228107 | 14.14850279 |

Moreover, Tables III and IV provide surface data for the singlet lenses of Examples I and II respectively.

TABLE III

Lens Design Surface Data for the Singlet Lens of Example I

| # | Type | Comment | Thickness | Glass | Radius |
|---|---|---|---|---|---|
| 0 | STANDARD | Object | 600 | | 350.9822 |
| 1 | EVENASPH | Object Side Optical Surface | 0.06303084 | Polymeric | 0.266365 |
| 2 | STANDARD | Substrate | 1 | Glass | 0.252527 |
| 3 | STANDARD | | 0.0986426 | Polymeric | 0.491281 |
| 4 | EVENASPH | Image Side Optical Surface | 0.64739737 | | 0.507771 |
| 5 | STANDARD | | 0.4 | Glass | 0.784409 |
| 6 | STANDARD | | 0.041 | | 0.931083 |
| 7 | STANDARD | Image Plane | 0 | | 0.961887 |

TABLE IV

Lens Design Surface Data for the Singlet Lens of Example II

| # | Type | Comment | Thickness | Glass | Radius |
|---|---|---|---|---|---|
| 0 | STANDARD | Object | 600 | | 299.3578 |
| 1 | EVENASPH | Object Side Optical Surface | 0.29447215 | Polymeric | 0.473009 |
| 2 | STANDARD | Substrate | 1.107 | Glass | 0.389594 |
| 3 | STANDARD | | 0.38489045 | Polymeric | 0.710285 |
| 4 | EVENASPH | Image Side Optical Surface | 1.99199885 | | 0.758598 |
| 5 | STANDARD | | 0 | | 1.098878 |
| 6 | STANDARD | | 0 | | 1.098878 |
| 7 | STANDARD | Image Plane | 0 | | 1.098878 |

In singlet lens of Example I, the total track length D is about 2.25 mm. The center thickness $t_c$ of the singlet lens is about 1.16 mm, with the substrate thickness (defined as line segment MN of FIG. 1B) being about 1.00 mm. Therefore, the ratio x (from Equation I) of center thickness $t_c$ to total track length D is about 0.52. The singlet lens of Example I also satisfies Equation (III) presented herein. The difference in magnitude of $^o a_1$ and $^i a_1$ from Table I (0.471838654−0.247940357) is 0.223898297 which is less than 0.247940357. Moreover, the singlet lens of Example I satisfies Equation (VI) presented herein. The ratio of $^o a_1$ and $^i a_1$ is 1.903.

In singlet lens design Example II, the total track length D is about 3.78 mm. The center thickness $t_c$ of the singlet lens is about 1.79 mm, with the substrate thickness (defined as line segment MN of FIG. 2) being about 1.11 mm. Therefore, the ratio x (from Equation I) of center thickness $t_c$ to total track length D is about 0.47.

In each of singlet lens design Examples I and II, the singlet lens is formed of polymeric lens surfaces on a glass substrate. The polymeric and glass materials are approximately index matched, with an index of refraction in a range between about 1.5 and about 1.55 for visible wavelengths. The Abbe number (measure of the material's dispersion) for the glass substrate materials is about 54. The Abbe number for the polymeric materials is about 51. Also, singlet lens design Example I includes a sensor cover glass with a similar refractive index and an Abbe number of about 62.

In some embodiments, the asphericity of the image side optical surface is greater than the asphericity of the object side optical surface of the singlet lens. In one embodiment, for example, the asphericity of the image side optical surface is greater than the asphericity of the object side optical surface as defined by the root mean square (rms) of the residual of each optical surface (object side and image side) within the clear aperture after subtraction of the best fit sphere. The singlet lens of Example I, for example, meets this condition. Alternatively, in some embodiments, the asphericity of the image side optical surface is greater than the asphericity of the object side optical surface of the singlet lens as defined by the peak to valley (PV) of the residual of each optical surface within the clear aperture after subtraction of the best fit sphere.

In some embodiments, the optical power of the singlet lens is substantially equally partitioned between object side optical surface and the image side optical surface. In some embodiments, for example, the object side optical surface and the image side optical surface of the singlet lens satisfy Equation (III) and/or Equation (VI) provided herein.

Figure 2A:
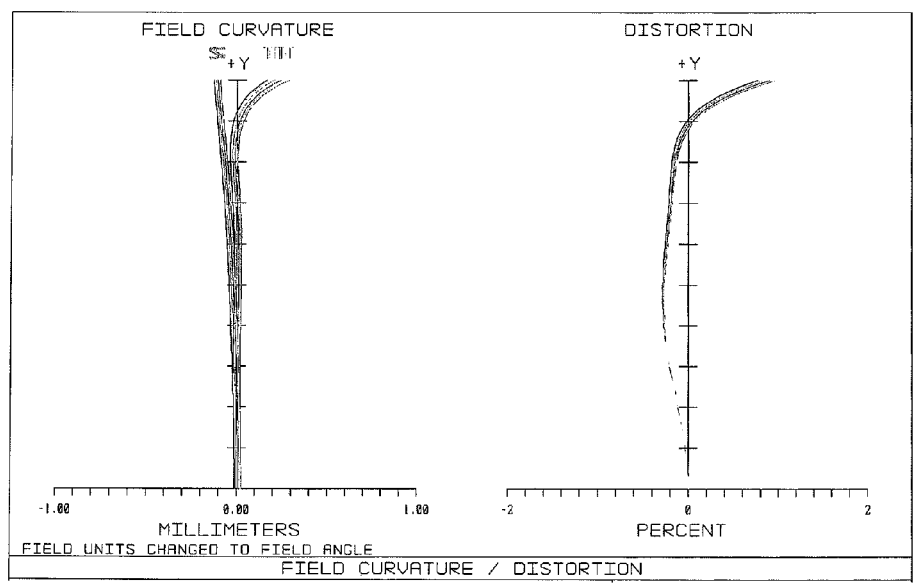
FIG. 2A illustrates optical aberrations of a singlet lens according to one embodiment of the present invention.
Figure 2B:
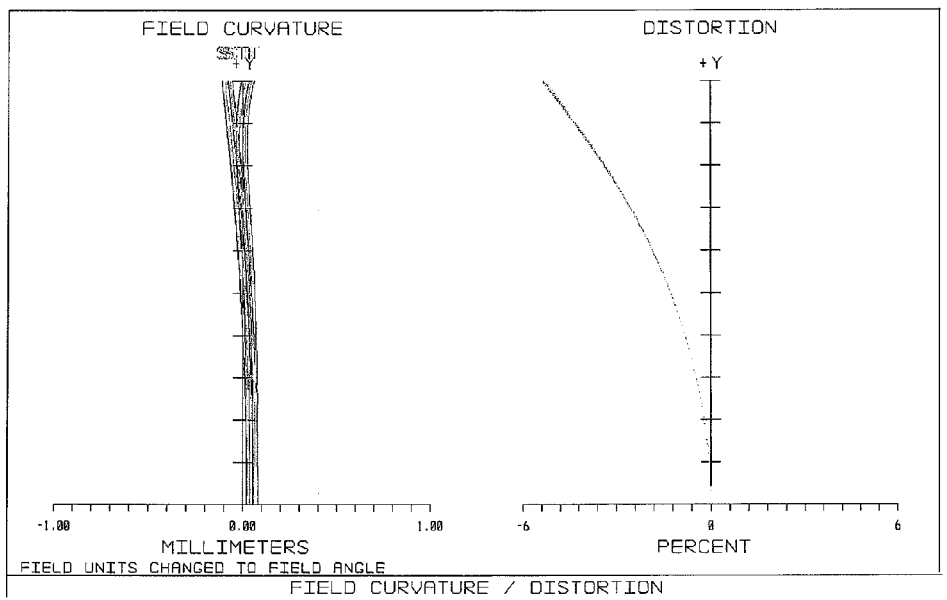
FIG. 2B illustrates optical aberrations of a singlet lens according to one embodiment of the present invention.

FIG. 2A illustrates optical aberrations of field curvature and distortion for the singlet lens of Example I according to one embodiment of the present invention. FIG. 2B illustrates optical aberrations of field curvature and distortion for the singlet lens of Example II according to one embodiment of the present invention.

Figure 3A:
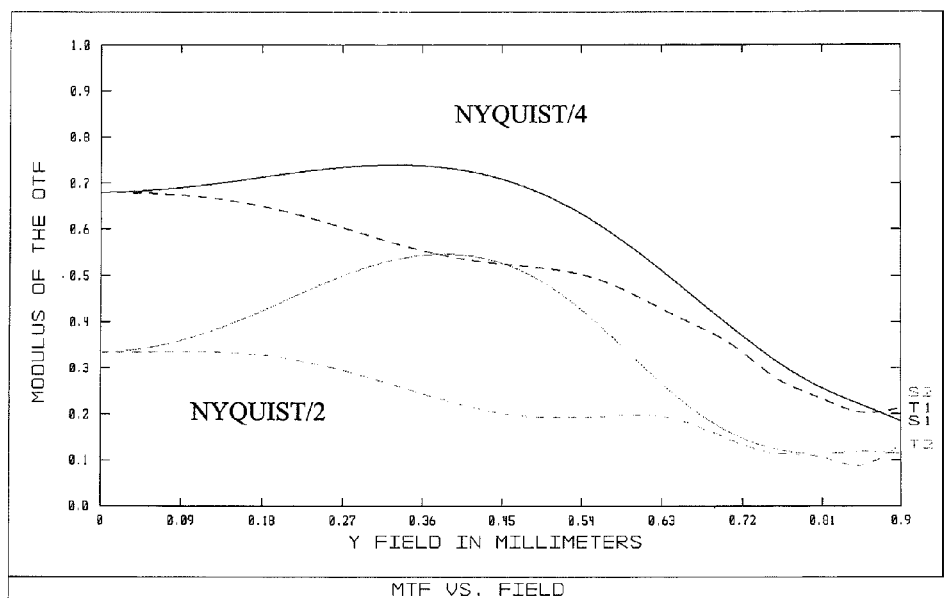
FIG. 3A illustrates modulation transfer function (MTF) performance versus field height for a singlet lens according to one embodiment of the present invention.
Figure 3B:
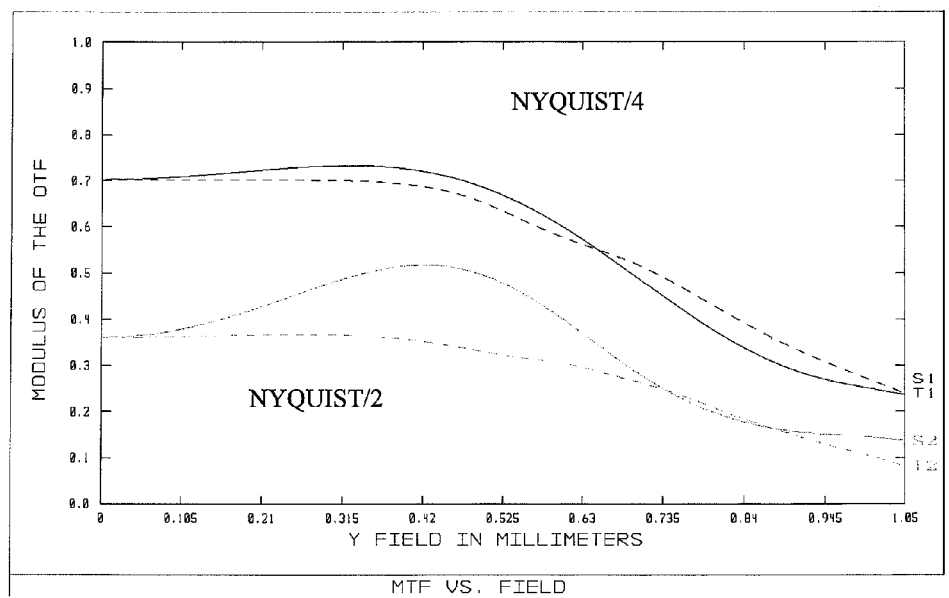
FIG. 3B illustrates modulation transfer function (MTF) performance versus field height for a singlet lens according to one embodiment of the present invention.

As FIGS. 2A and 2B illustrate, the singlet lens Example I is characterized by a lower overall distortion than the singlet lens Example II. Given similar design constraints, this improved distortion performance may be obtained at the expense of optical (MTF) performance as suggested by the MTF curves shown in FIGS. 3A and 3B. FIG. 3A provides graphs of MTF performance versus field heights for the singlet lens design Example I. Similarly, FIG. 3B provides graphs of MTF performance versus field heights for the singlet lens design Example II. Each of the graphs in FIGS. 3A and 3B include tangential and sagittal curves for Nyquist/2 and Nyquist/4 frequencies. As indicated above, singlet lens design Example II provides marginally improved optical performance at the expense of increased distortion.

Nyquist frequencies for a lens-sensor combination will depend on pixel size of the image sensor. Given the image circle radii illustrated in Tables III and IV, the single lens design Examples I and II may be used with a variety of sensor configurations. In one embodiment, the lens designs are used with a VGA sensor having a pixel size of about 2.2 or 2.25 microns. In another embodiment, the lens designs are used with a CIF sensor having a pixel size of about 3.6 microns.

In another aspect, the present invention provides an optical apparatus comprising a singlet lens described herein. In some embodiments, the optical apparatus further comprises an optoelectronic element. In some embodiments, an optoelectronic element comprises an electromagnetic radiation sensing element. An electromagnetic radiation sensing element, in some embodiments, comprises a focal plane array fabricated from one or more semiconducting materials. In some embodiments, a sensing element comprises a charge coupled device (CCD). In some embodiments, a sensing element comprises a complimentary metal oxide semiconductor (CMOS) architecture.

In some embodiments, an optoelectronic element comprises a light emitting element. A light emitting element, in some embodiments, comprises a light emitting diode or a laser.

In some embodiments, the optoelectronic element is coupled to the singlet lens by a spacer. In some embodiments, the singlet lens is coupled to the coverglass of a packaged optoelectronic element by a spacer.

Figure 4:
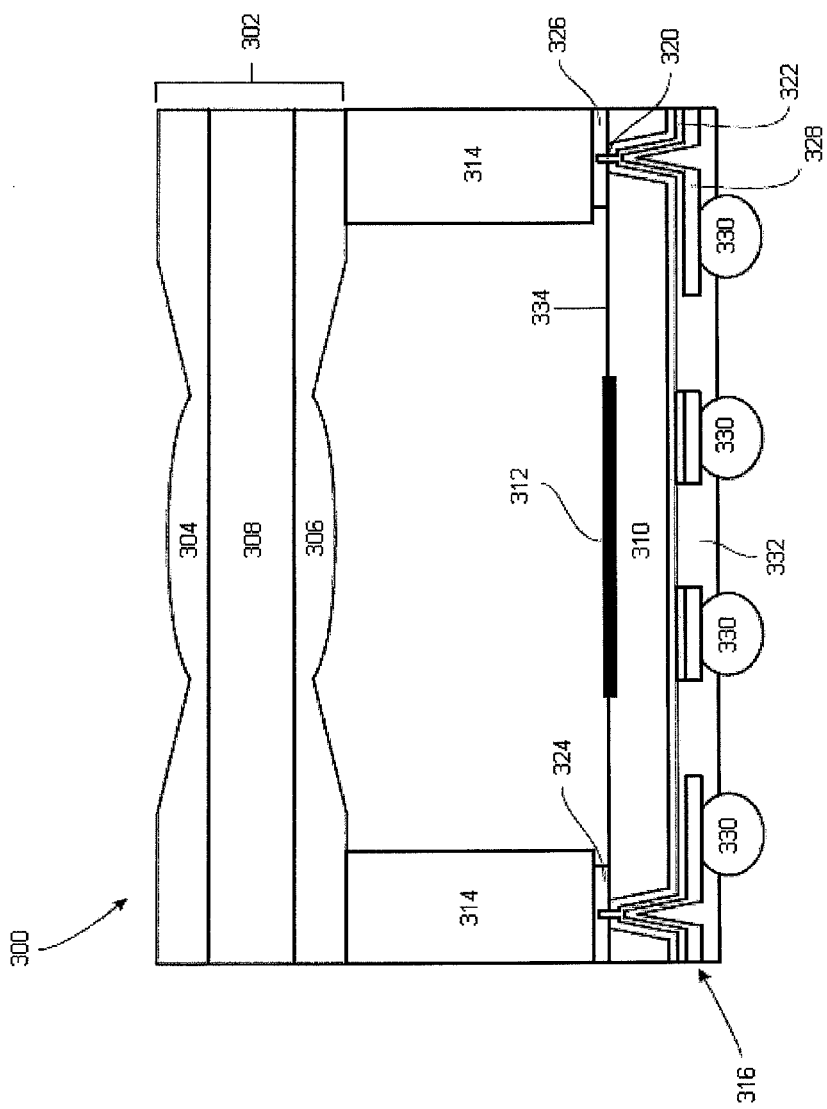
FIG. 4 illustrates a cross-sectional view of an optical imaging apparatus comprising a singlet lens according to one embodiment of the present invention.

FIG. 4 illustrates a cross-sectional view of an optical imaging apparatus comprising a singlet lens according to one embodiment of the present invention. The singlet lens (302) of the optical imaging apparatus (300) comprises an object side optical surface (304) and an image side optical surface (306) disposed on a optically transmissive substrate (308), the singlet lens (302) satisfying Equation (I).

The optical imaging apparatus (300) further comprises an optoelectronic element (310) operable to detect electromagnetic radiation. The optoelectronic element (310) comprises a photosensitive region (312) operable to detect electromagnetic radiation received by the optical imaging apparatus (300). In some embodiments, the object side optical surface (304) and the image side optical surface (306) of the singlet lens (302) interact with electromagnetic radiation received by the optical imaging apparatus (300) to focus the electromagnetic radiation on the photosensitive region (312) of the optoelectronic element (310).

In the embodiment illustrated in FIG. 4, the singlet lens (302) is coupled to the coverglass (334) of the optoelectronic element (310) by a spacer (314). In one embodiment, a spacer comprises a glass fiber reinforced polymeric resin. In some embodiments, a glass fiber reinforced polymeric resin comprises FR-4. Certain formations of FR-4 are provided with different coefficients of thermal expansion (CTE) in different directions. For example, in one embodiment, the spacer material is characterized by relatively large coefficient of thermal expansion in a first direction and a substantially smaller coefficient of thermal expansion in a second substantially orthogonal direction. This difference in CTE may be as large as an order of magnitude (e.g., about 175 ppm/degree C versus about 14 ppm/degree C in orthogonal directions). In such cases, the spacer material may be oriented so that the least amount of thermal expansion occurs in a direction substantially parallel to the wafer level lens of the optical element. A correspondingly larger thermal expansion will thus occur along the optical axis of the element. This particular configuration may help minimize stress at the adhesive junctions over temperature changes.

In some embodiments, an electrical circuit (316) is connected to the optoelectronic element (310). The electrical circuit (316) in some embodiments, is an input/output (I/O) circuit for communicating with the sensing element (310).

In some embodiments, the electrical circuit (316) comprises an electrophoretic coating (E-coat) (318) on the side of the sensing element (310) opposing the photosensitive region (312). The electrical circuit (316) also comprises through silicon vias (TSV) (320) of sputtered metal (322) on the E-coat (318) terminating in the bond pads (324, 326)/solder mask structure between the optoelectronic element (310) and coverglass (334). The sputtered metal in some embodiments, is deposited in conjunction with lithographic techniques to provide the initial pattern of a ball grid array interface. The TSV (320) is plated with an additional metal (328) such as lead and a ball grid array (330) completes the electric circuit (316). A solder mask (332) fills between individual contacts of the ball grid array (330).

In some embodiments, electrical circuits coupled to the optoelectronic element of an optical apparatus of the present invention are consistent with the electrical circuits of the SHELLCASE® technologies, including the SHELLCASE® MVP and SHELLCASE® CF technologies, commercially available from Tessera Inc. of San Jose, Calif.

Singlet lenses and optical imaging apparatus of the present invention, in some embodiments, can be used in camera module applications including, but not limited to, camera modules for communication devices including cellular phones, mobile handsets and computers. In some embodiments, singlet lenses and optical imaging apparatus of the present invention can be used in various surveillance applications and equipment requiring miniaturization of optical components such as mobile computing devices, automobiles, consumer electronics, toys and the like. Additionally, in some embodiments wherein the optoelectronic element of an optical apparatus described herein is a light emitting element, the optical apparatus can be used in various signaling or illumination applications.

Figure 5:
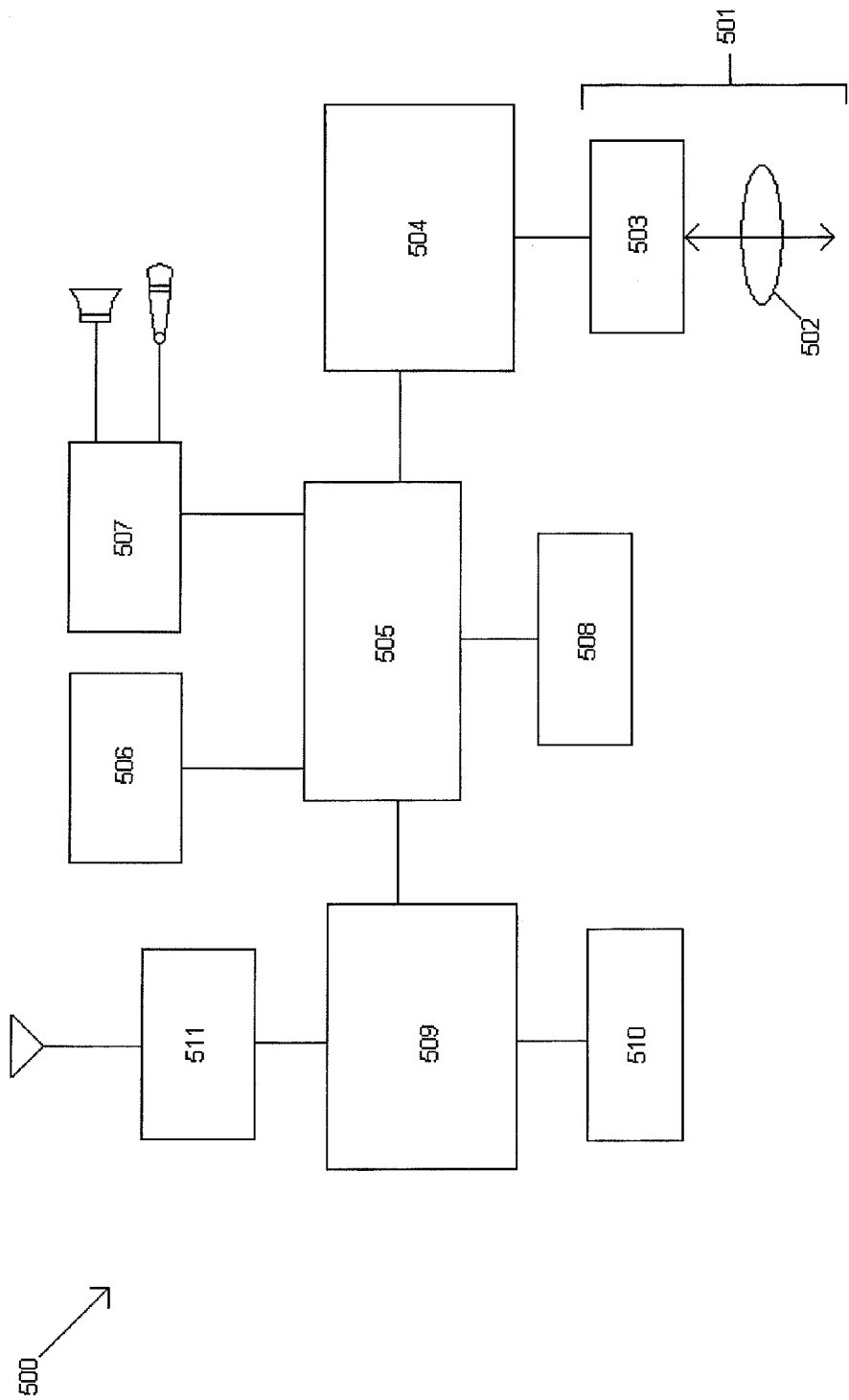
FIG. 5 illustrates a block diagram of a communication apparatus comprising a singlet lens according to one embodiment of the present invention.
Figure 6:
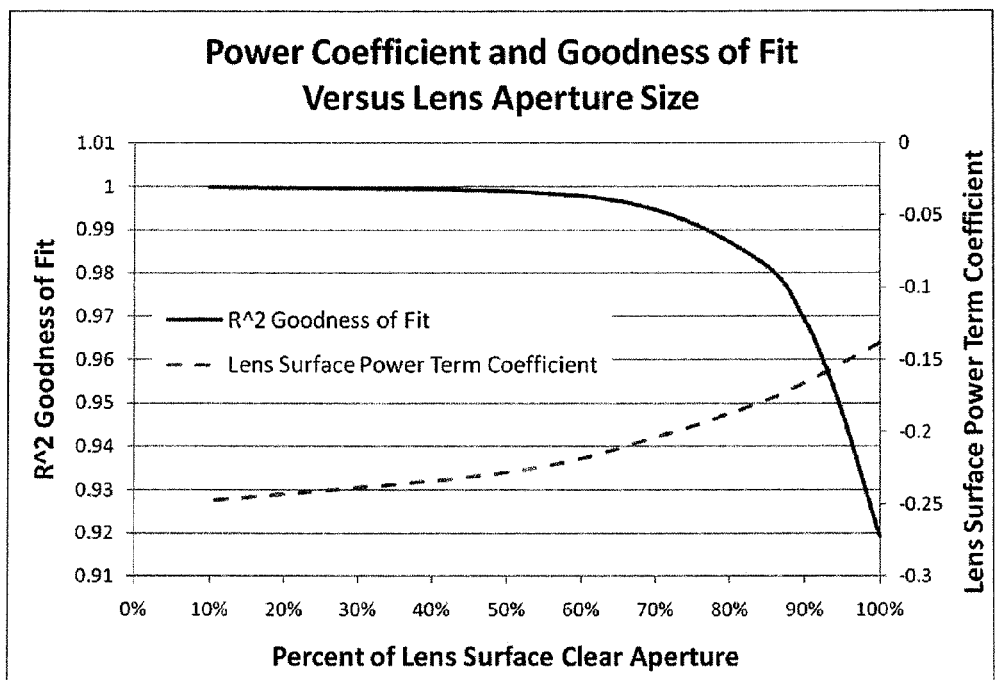
FIG. 6 illustrates the relationship between the goodness of fit for an optical surface of a singlet lens and the aperture of the lens surface over which the power term is fit according to one embodiment of the present invention.

FIG. 5 illustrates a block diagram of a communication device, such as a mobile handset, comprising an optical imaging apparatus described herein. The communication device (500) of FIG. 5 comprises an optical imaging apparatus (501) comprising a singlet lens (502) described herein and an image sensor (503). In some embodiments, the optical imaging apparatus can have a construction as illustrated in FIG. 4. The image sensor (503) is in electrical communication with an image processor (504). The image processor (504) is in electrical communication with an application processor (505). Additional components of the communication device (500) are in electrical communication with the application processor including a user interface (506), audio I/O (507), memory (508) and a baseband processor (509). The baseband processor (509) has memory (510) and a transceiver (511) associated therewith.

In another aspect, the present invention provides a optical wafer comprising a plurality of joined singlet lenses described herein. In some embodiments, the optical wafer comprising the plurality of joined singlet lenses is coupled to a sensor wafer comprising a plurality of joined sensing elements, wherein the plurality of singlet lenses align with the plurality of sensing elements to provide a plurality of joined optical apparatus. In some embodiments, the optical wafer is coupled to the sensor wafer by a perforated wafer, such as a spacer wafer. Moreover, in some embodiments, the plurality of joined optical apparatus can be singulated to provide a plurality of individual optical apparatus.

In another aspect, the present invention provides methods of making a singlet lens described herein. In one embodiment, a method of making a singlet lens comprises providing a optically transmissive substrate, disposing an object side optical surface on the substrate and disposing an image side optical surface on the substrate, the object side optical surface having a convex shape at the vertex of the surface and the image side optical surface having a convex shape at the vertex of the surface, the singlet lens satisfying Equation (I). In some embodiments, the object side optical surface and the image side optical surface are aspherical having any of the properties described herein.

In some embodiments, the substrate comprises a substrate wafer on which a plurality of object side optical surfaces and a plurality of image side optical surfaces are deposited to provide a plurality of joined singlet lenses of the present invention.

In another aspect, the present provides a method of making a plurality of optical imaging apparatus. In one embodiment, a method of making a plurality of optical imaging apparatus comprises providing an optical wafer comprising a plurality of singlet lenses of the present invention, providing a sensor wafer comprising a plurality of sensing elements and coupling the optical wafer to the sensor wafer with a perforated wafer to provide a plurality of joined optical imaging apparatus. Coupling the optical wafer to the sensor wafer, in some embodiments, achieves the desired alignment between the plurality of singlet lenses and the plurality of sensing elements. In some embodiments, the method further comprises singulating the plurality of joined optical imaging apparatus to provide a plurality of individual optical imaging apparatus.

In another embodiment, a method of making a plurality of optical imaging apparatus comprises providing an optical wafer comprising a plurality of singlet lenses of the present invention and singulating the plurality of singlet lenses. The singulated singlet lenses are subsequently coupled to one another by a perforated wafer and coupled to a sensor wafer through the perforated wafer, the sensor wafer comprising a plurality of sensing elements. Coupling the plurality of singlet lenses to the sensor wafer through the perforated wafer, in some embodiments, achieves the desired alignment between plurality of singlet lenses and the plurality of sensing elements to provide a plurality of joined optical imaging apparatus. In some embodiments, the method further comprises singulating the plurality of joined optical imaging apparatus to provide a plurality of individual optical imaging apparatus.

In another embodiment, arrays of singlet lenses may be formed on a single wafer and singulated to form a plurality of single lens dies. The singlet lens dies may be bonded into a lens barrel for subsequent placement onto an image sensor device.

In a further aspect, the present invention provides a method of imaging a scene. In one embodiment, a method of imaging a scene comprises providing an optical imaging apparatus comprising a singlet lens described herein and a sensing element and receiving electromagnetic radiation from the scene. The received electromagnetic radiation passes through the singlet lens and is detected by the sensing element. The sensing element translates the received electromagnetic radiation into an electrical response for constructing an electronic image of the scene. In some embodiments, the imaged scene has a TV distortion according to Equation (VII) of less than about 6%. In some embodiments, the imaged scene has a TV distortion according to Equation (VII) of less than about 1% or less than about 0.5%.

In some embodiments, the imaged scene has a maximum optical distortion according to Equation (VIII) of less than about 6% over a field of view of at least 50°. In some embodiments, the imaged scene has a maximum optical distortion according to Equation (VIII) of less than about 3% over a field of view of at least 50°. In some embodiments, the maximum optical distortion of an imaged scene is over a field of view of at least 60°.

In some embodiments of imaging a scene, the optical apparatus comprises a solid state camera.

That which is claimed is:
1. A singlet lens comprising:
an object side optical surface, wherein the object side optical surface is aspherical; and
an image side optical surface, wherein the image side optical surface is aspherical, such that asphericity of the image side optical surface is greater than the asphericity of the object side optical surface,
the object side optical surface having a convex shape at the vertex of the surface and the image side optical surface having a convex shape at the vertex of the surface, the singlet lens satisfying the condition:

$$t_c \geq xD$$

wherein $t_c$ is the center thickness of the singlet lens, D is the distance from an image plane to the vertex of the object side optical surface and x is a coefficient having a value of at least 0.30.

2. The singlet lens of claim 1, wherein x ranges from 0.3 to 0.75.

3. The singlet lens of claim 1, wherein x ranges from 0.4 to 0.6.

4. The singlet lens of claim 1, wherein the object side optical surface is aspherical.

5. The singlet lens of claim 1, wherein the image side optical surface is aspherical.

6. The singlet lens of claim 1 further comprising an aperture positioned closer to the image plane than the vertex of the object side optical surface.

7. The singlet lens of claim 6, wherein the aperture is positioned between the object side optical surface and the image side optical surface.

8. The singlet lens of claim 6, wherein the object side optical surface and the image side optical surface are disposed on a substrate wafer.

9. A singlet lens comprising:
an object side optical surface; and
an image side optical surface,
the object side optical surface having a convex shape at the vertex of the surface and the image side optical surface having a convex shape at the vertex of the surface, the singlet lens satisfying the condition:

$$t_c \geq xD$$

wherein $t_c$ is the center thickness of the singlet lens, D is the distance from an image plane to the vertex of the object side optical surface and x is a coefficient having a value of at least 0.30, and wherein the object side optical surface and the image side optical surface satisfy the equation:

$$0.5 < \frac{|^o a_1|}{|^i a_1|} < 2$$

wherein $^o a_1$ is the coefficient of the $r^2$ term over an inner portion of the object side optical surface according to the equation:

$$S(r) = {^o a_1} r^2$$

and $^i a_1$ is the coefficient of the $r^2$ term over an inner portion of the image side optical surface according to the equation:

$$S(r) = {^i a_1} r^2$$

wherein the inner portion of the object side optical surface is the portion of the object side optical surface fit by the equation $S(r) = {^o a_1} r^2$ to a $R^2$ goodness of fit of at least 0.98 and wherein the inner portion of the image side optical surface is the portion of the image side optical surface fit by the equation $S(r) = {^i a_1} r^2$ to a $R^2$ goodness of fit of at least about 0.98.

10. The singlet lens of claim 9, wherein x ranges from 0.3 to 0.75.

11. The singlet lens of claim 9, wherein x ranges from 0.4 to 0.6.

12. The singlet lens of claim 9 further comprising an aperture positioned closer to the image plane than the vertex of the object side optical surface.

13. The singlet lens of claim 12, wherein the aperture is positioned between the object side optical surface and the image side optical surface.

14. The singlet lens of claim 12, wherein the object side optical surface and the image side optical surface are disposed on a substrate wafer.

15. The singlet lens of claim 1, A singlet lens comprising:
an object side optical surface; and
an image side optical surface,
the object side optical surface having a convex shape at the vertex of the surface and the image side optical surface having a convex shape at the vertex of the surface, the singlet lens satisfying the condition:

$$t_c \geq xD$$

wherein $t_c$ is the center thickness of the singlet lens, D is the distance from an image plane to the vertex of the object side optical surface and x is a coefficient having a value of at least 0.30, and wherein the object side optical surface and the image side optical surface satisfy the equation:

$$|(|^o a_1| - |^i a_1|)| < |^{o,i} a_1|$$

wherein $^o a_1$ is the coefficient of the $r^2$ term for the object side optical surface according to the equation:

$$S(r) = {^o a_1} r^2 + {^o a_2} r^4 + {^o a_3} r^6 + {^o a_4} r^8 + {^o a_5} r^{10} + {^o a_6} r^{12} + {^o a_7} r^{14} + {^o a_8} r^{16}$$

and $^i a_1$ is the coefficient of the $r^2$ term for the image side optical surface according to equation:

$$S(r) = {^i a_1} r^2 + {^i a_2} r^4 + {^i a_3} r^6 + {^i a_4} r^8 + {^i a_5} r^{10} + {^i a_6} r^{12} + {^i a_7} r^{14} + {^i a_8} r^{16}$$

and $^{o,i} a_1$ is $^o a_1$ or $^i a_1$, whichever has a smaller magnitude.

16. The singlet lens of claim 15, wherein $^o a_1$ is the coefficient of the $r^2$ term over an inner portion of the object side optical surface according to the equation:

$$S(r) = {^o a_1} r^2$$

and $^i a_1$ is the coefficient of the $r^2$ term over an inner portion of the image side optical surface according to the equation:

$$S(r) = {^i a_1} r^2$$

wherein the inner portion of the object side optical surface is the portion of the object side optical surface fit by the equation $S(r) = {^o a_1} r^2$ to a $R^2$ goodness of fit of at least 0.98 and wherein the inner portion of the image side optical surface is the portion of the image side optical surface fit by the equation $S(r) = {^i a_1} r^2$ to a $R^2$ goodness of fit of at least about 0.98.

17. The singlet lens of claim 15, wherein x ranges from 0.3 to 0.75.

18. The singlet lens of claim 15, wherein x ranges from 0.4 to 0.6.

19. The singlet lens of claim 15 further comprising an aperture positioned closer to the image plane than the vertex of the object side optical surface.

20. The singlet lens of claim 19, wherein the aperture is positioned between the object side optical surface and the image side optical surface.

21. The singlet lens of claim 19, wherein the object side optical surface and the image side optical surface are disposed on a substrate wafer.

22. A method of making a singlet lens comprising:
providing an optically transmissive substrate;
disposing an object side optical surface on the substrate, the object side optical surface having a convex shape at the vertex of the surface;
disposing an image side optical surface on the substrate, the image side optical surface having a convex shape at the vertex of the surface, the singlet lens satisfying the condition:

$$t_c \geq xD$$

wherein $t_c$ is the center thickness of the singlet lens, D is the distance from an image plane to the vertex of the object side optical surface and x is a coefficient having a value of at least 0.30, and wherein the object side optical surface and the image side optical surface satisfy the equation:

$$0.5 < \frac{|^o a_1|}{|^i a_1|} < 2$$

wherein $^o a_1$ is the coefficient of the $r^2$ term over an inner portion of the object side optical surface according to the equation:

$$S(r) = {^o a_1} r^2$$

and $^i a_1$ is the coefficient of the $r^2$ term over an inner portion of the image side optical surface according to the equation:

$$S(r) = {^i a_1} r^2$$

wherein the inner portion of the object side optical surface is the portion of the object side optical surface fit by the equation $S(r) = {^o a_1} r^2$ to a $R^2$ goodness of fit of at least 0.98 and wherein the inner portion of the image side optical surface is the portion of the image side optical surface fit by the equation $S(r) = {^i a_1} r^2$ to a $R^2$ goodness of fit of at least about 0.98.

23. The method of claim 22 further comprising disposing an aperture between the object side optical surface and the image side optical surface.

24. A method of making a singlet lens comprising:
providing an optically transmissive substrate;
disposing an object side optical surface on the substrate, the object side optical surface having a convex shape at the vertex of the surface;
disposing an image side optical surface on the substrate, the image side optical surface having a convex shape at the vertex of the surface, the singlet lens satisfying the condition:

$$t_c \geq xD$$

wherein $t_c$ is the center thickness of the singlet lens, D is the distance from an image plane to the vertex of the object side optical surface and x is a coefficient having a value of at least 0.30, and
wherein the object side optical surface and the image side optical surface satisfy the equation:

$$|(|{}^o a_1|-|{}^i a_1|)|<|{}^{o,i} a_1|$$

wherein ${}^o a_1$ is the coefficient of the $r^2$ term for the object side optical surface according to the equation:

$$S(r) = {}^o a_1 r^2 + {}^o a_2 r^4 + {}^o a_3 r^6 + {}^o a_4 r^8 + {}^o a_5 r^{10} + {}^o a_6 r^{12} + {}^o a_7 r^{14} + {}^o a_8 r^{16}$$

and ${}^i a_1$ is the coefficient of the $r^2$ term for the image side optical surface according to equation:

$$S(r) = {}^i a_1 r^2 + {}^i a_2 r^4 + {}^i a_3 r^6 + {}^i a_4 r^8 + {}^i a_5 r^{10} + {}^i a_6 r^{12} + {}^i a_7 r^{14} + {}^i a_8 r^{16}$$

and ${}^{o,i} a_1$ is ${}^o a_1$ or ${}^i a_1$, whichever has a smaller magnitude.

25. The method of claim 24, wherein ${}^o a_1$ is the coefficient of the $r^2$ term over an inner portion of the object side optical surface according to the equation:

$$S(r) = {}^o a_1 r^2$$

and ${}^i a_1$ is the coefficient of the $r^2$ term over an inner portion of the image side optical surface according to the equation:

$$S(r) = {}^i a_1 r^2$$

wherein the inner portion of the object side optical surface is the portion of the object side optical surface fit by the equation $S(r) = {}^o a_1 r^2$ to a $R^2$ goodness of fit of at least 0.98 and wherein the inner portion of the image side optical surface is the portion of the image side optical surface fit by the equation $S(r) = {}^i a_1 r^2$ to a $R^2$ goodness of fit of at least about 0.98.

26. The method of claim 24 further comprising disposing an aperture between the object side optical surface and the image side optical surface.

27. A method of making a plurality of optical imaging apparatus comprising:
providing an optical wafer comprising a plurality of singlet lenses;
providing a sensor wafer comprising a plurality of sensing elements; and
coupling the optical wafer to the sensor wafer to provide a plurality of joined optical imaging apparatus wherein the optical wafer and the sensor wafer are coupled by a perforated wafer, and wherein at least one of the singlet lenses comprises:
an object side optical surface; and
an image side optical surface,
the object side optical surface having a convex shape at the vertex of the surface and the image side optical surface having a convex shape at the vertex of the surface, the singlet lens satisfying the condition:

$$t_c \geq xD$$

wherein $t_c$ is the center thickness of the singlet lens, D is the distance from an image plane to the vertex of the object side optical surface and x is a coefficient having a value of at least 0.30.

28. The method of claim 27 further comprising aligning the plurality of singlet lenses with the plurality of sensing elements.

29. The method of claim 27 further comprising singulating the plurality of joined optical imaging apparatus to provide a plurality of individual optical imaging apparatus.

30. A method of making a plurality of optical imaging apparatus comprising:
providing an optical wafer comprising a plurality of singlet lenses;
singulating the plurality of singlet lenses; and
coupling the singulated singlet lenses to a perforated wafer, wherein at least one of the singlet lenses comprises:
an object side optical surface; and
an image side optical surface,
the object side optical surface having a convex shape at the vertex of the surface and the image side optical surface having a convex shape at the vertex of the surface, the singlet lens satisfying the condition:

$$t_c \geq xD$$

wherein $t_c$ is the center thickness of the singlet lens, D is the distance from an image plane to the vertex of the object side optical surface and x is a coefficient having a value of at least 0.30.

31. The method of claim 30 further comprising providing a sensor wafer comprising a plurality of sensing elements and coupling the sensor wafer to the perforated wafer to provide a plurality of joined optical imaging apparatus.

32. The method of claim 31, wherein coupling the sensor wafer to the perforated wafer substantially aligns the plurality of singlet lenses with the plurality of sensing elements.

33. The method of claim 31 further comprising singulating the plurality of joined optical imaging apparatus to provide a plurality of individual optical imaging apparatus.

34. A method of imaging a scene comprising:
providing an optical imaging apparatus comprising a singlet lens and a sensing element;
passing electromagnetic radiation received from the scene through the singlet lens to the sensing element;
detecting the electromagnetic radiation passed through the singlet lens with the sensing element; and
translating the detected electromagnetic radiation into an electrical response for constructing an electronic image of the scene, wherein the singlet lenses comprises:
an object side optical surface; and
an image side optical surface,
the object side optical surface having a convex shape at the vertex of the surface and the image side optical surface having a convex shape at the vertex of the surface, the singlet lens satisfying the condition:

$$t_c \geq xD$$

wherein $t_c$ is the center thickness of the singlet lens, D is the distance from an image plane to the vertex of the object side optical surface and x is a coefficient having a value of at least 0.30, and
wherein the imaged scene has a TV distortion of less than about 6% according to the equation:

$$\text{TV Distortion (\%)} = 100 \times [(A_1 + A_2)/2) - B]/B$$

wherein $A_1$ and $A_2$ are edge heights of the image and B is the center height of the image.

35. The method of claim 34, wherein the imaged scene has a TV distortion less than about 1%.

36. The method of claim 34, wherein the optical imaging apparatus is a mobile handset.

37. A method of imaging a scene comprising:
provinding an optical imaging apparatus comprising a singlet lens and a sensing element;
passing electromagnetic radiation received from the scene through the singlet lens to the sensing element;
detecting the electromagnetic radiation passed through the singlet lens with the sensing element; and
translating the detected electromagnetic radiation into an electrical response for constructing an electronic image of the scene, wherein the singlet lenses comprises:
an object side optical surface; and
an image side optical surface,
the object side optical surface having a convex shape at the vertex of the surface and the image side optical surface having a convex shape at the vertex of the surface, the singlet lens satisfying the condition:

$$t_c \geq xD$$

wherein $t_c$ is the center thickness of the singlet lens, D is the distance from an image plane to the vertex of the object side optical surface and x is a coefficient having a value of at least 0.30, and
wherein the imaged scene has a maximum optical distortion less than about 3% over a field of view of at least 50° according to the equation:

$$\text{Distortion (\%)} = [(h_i/h_p) - 1] \times 100$$

wherein $h_i$ is the distance from the image center to any chosen field point within the scene and $h_p$ is the distance from the image center to where the chosen field point would be if the image had no distortion.

\* \* \* \* \*